United States Patent [19]
Collender

[11] 3,815,979
[45] June 11, 1974

[54] UNAIDED THREE DIMENSIONAL AIMING POINT PHOTOGRAPHY AND REPRODUCTION METHOD AND APPARATUS

[76] Inventor: Robert Bruce Collender, 709 Patterson Ave., Glendale, Calif. 91203

[22] Filed: May 17, 1973

[21] Appl. No.: 361,282

[52] U.S. Cl.................... 352/38, 352/40, 352/43, 352/44, 352/53, 352/57, 352/58, 352/133
[51] Int. Cl. .......................................... G03b 21/32
[58] Field of Search ............ 352/38, 40, 43, 44, 53, 352/57, 58, 81, 133

[56] References Cited
UNITED STATES PATENTS
| | | | |
|---|---|---|---|
| 2,413,269 | 12/1946 | Waller | 352/40 |
| 3,178,720 | 4/1965 | Collender | 352/38 |
| 3,520,588 | 7/1970 | Salyer | 352/81 X |

*Primary Examiner*—Monroe H. Hayes

[57] ABSTRACT

My invention relates to photographing scenes and objects with the purpose of stereoscopic viewing of the reproduction without viewing aids at the eyes. The apparatus is constructed so that a group of stationary cameras or a single camera sequentially positioned at the progressive locations and arranged along a circular arc, aim their optical axes at a point on the opposite side of the same circle. The pictures photographed are then processed and arranged to be repeatedly and sequentially projected at a high frame rate by a stationary projector aimed at the same relative point as in the photographing of the scene or object. This aim-point is coincident with a reflective circularly cylindrical screen surface. The cylindrical obturating surface is part of a circle which contains vertical transparent slits. The observer looks thru a horizontally moving vertical slit to see a stereoscopic picture wherein the pictures for each eye are time progressively generated and different for each eye. Another embodiment of my invention uses rotating minute vertical reflective/- dispersive elements in a cylindrical screen surface to reflect and direct the projected pictures to imaginary slits on the same circle containing the screen. For this embodiment no obturating surface is employed between screen and observer and the observer is not restricted in having the slit locus in front of his eyes. The slit locus may be in back of him with the result that the viewer may move quite close to the spatial image in the reproduction of a three dimensional scene.

1 Claim, 12 Drawing Figures

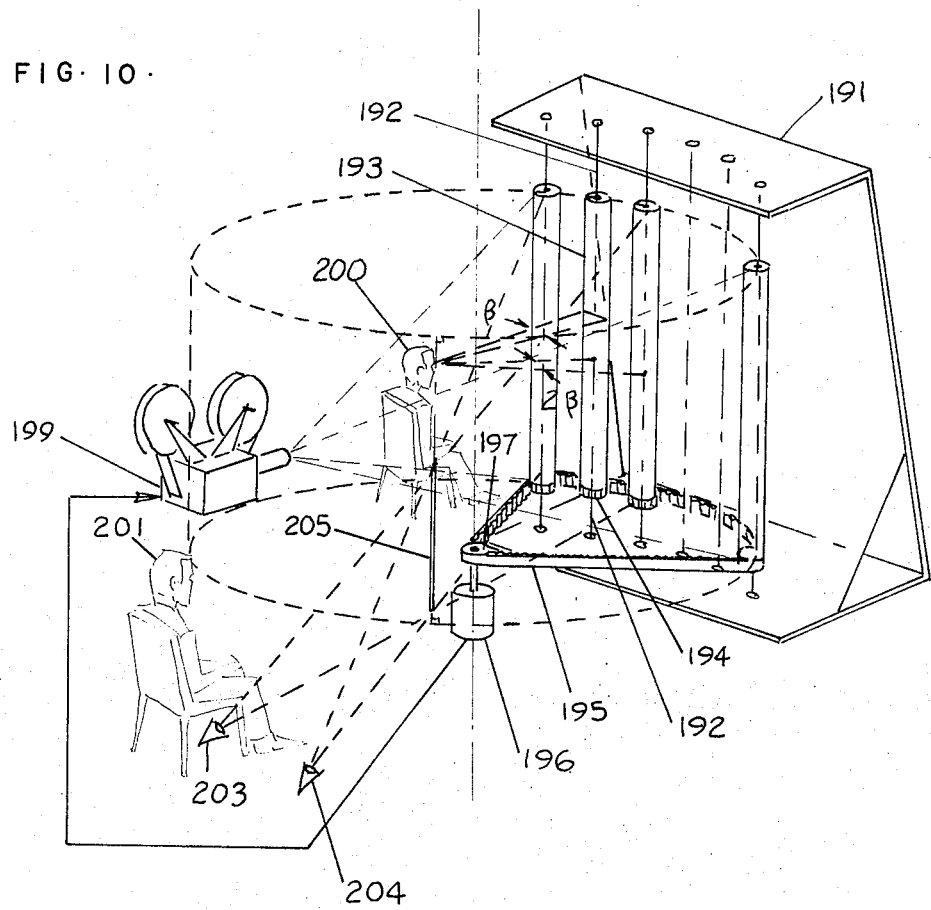
FIG·10·

3,815,979

UNAIDED THREE DIMENSIONAL AIMING POINT PHOTOGRAPHY AND REPRODUCTION METHOD AND APPARATUS

CROSS-REFERENCES TO RELATED APPLICATIONS

With reference to my U.S. Pat. No. 3,178,720 of Apr. 13, 1965, my new invention is significantly different. U.S. Pat. No. 3,178,720 describes an incremental rotation of the camera image about the optical axis as the camera photographs successive pictures around the scene. The camera did not remain pointed at an aiming point on the opposite side of the circle described by its traverse path and the reproduced pictures were incrementally rotated and swept 360 degrees. The pictures were projected on a translucent screen at the end of a revolving drum at right angles to its rotation axis and pictures were imaged by a revolving mirror.

In my new invention there is no incremental rotation of the camera about the optical axis as the camera assumes sequential positions along a circular arc. The camera aims toward a point on the opposite side of said circular arc as viewed from a plan view. In the reproduction, all pictures are projected at a fixed screen location and do not incrementally rotate. Pictures are projected onto the inside surface of the cylindrical drum and no revolving single mirror is used. Instead a high gain screen with a horizontally moving vertical viewing slit or a new screen which can return the entire incident picture by reflection to a pseudo vertical viewing slit is used. Observers may see a three dimensional picture without the need for special viewing glasses by locating their eyes either in front of or behind the pseudo slits.

With reference to another of my U.S. Pat. No. 3,324,760 of June 13, 1967, my new invention is also significantly different. U.S. Pat. No. 3,324,760 describes a radial high frame rate sweeping projector that projects onto the inside surface of a surrounding concentric cylindrical screen. A thin vertical viewing slit followed the laterally shifting picture. The slit locus was concaved to the observer. Several radial projectors were employed that projected contiguous pictures that both swept and changed perspective with time. A real vertical slit in an obturative drum was used to force the observer's eyes to see various vertical slices of picture information until each eye had an entire picture scanned for it. Eyes were forced to occupy space on the opposite side of the slit locus with respect to the cylindrical screen.

My new invention uses a stationary projector (not a sweeping projector). The slit locus is convexed to the observer. The high speed projector projects pictures on one fixed area of the screen. A real or pseudo vertical exit slit is described and eyes can be either inside or outside the pseudo vertical slit locus. A means is also provided to direct the screen reflected light to a moving pseudo slit.

BRIEF SUMMARY OF THE INVENTION

My invention relates to a system of recording and stereoscopic viewing of scenes and particularly to a method and means for accomplishing this purpose without viewing aids at the eyes of the observers.

Man has sought for decades to reproduce scenes in stereoscopy without the use of viewing aids at the eyes of the observers and in a manner such that a number of persons might view such scenes at one time and without restriction as to their various individual positions.

I have found that by presenting a relatively very large number of related images of the scene to be viewed behind a rapidly moving vertical slit aperture the parallax thus occurring prevents one eye of each observer from seeing what the other eye sees at any and every instant of time. The aperture being in motion, each eye sees a complete image within a short interval of time. I make this interval within the presistance of vision for human observers. The brain fuses the two eye observations into a single stereoscopic view image, as my practical results predicate.

Accordingly, I am able to present a stereoscopic view of a scene to one or any reasonable number of viewers. If any or all of the viewers walk around my appartus they will see the scene in different aspect, just as though they walked around the same scene in real life.

If the scene is reproduced from a series of still transparencies taken around the scene according to my method and apparatus the objects within the scene are stationary and a still stereoscopic picture is obtained.

Considering my system in greater detail the perspective that one eye of any observer sees is made up of discrete vertical lines of image information taken at discrete instants of time. At these same instants of time the other eye of that observer sees a completely different perspective. The net perspective for the two eyes is different, of course, because the eyes are not coincident in space, but are spaced apart horizontally, as is well known. Considering the image as an entity, it is dissected in time and in space.

An object of my invention is to provide viewing of three dimensional images without the use of viewing aids at the eyes of the observer.

Another object is to provide a stereoscopic system in which various perspectives of the scene viewed may be obtained by changing one's position around the reproducing apparatus.

Another object is to provide a stereoscopic system in which various perspectives of the scene viewed may be obtained by changing one's position within the surrounding reproducing apparatus.

Another object is to provide a basic stereoscopic method applicable to known forms of image reproduction processes.

Another object is to provide means for reproducing relatively large images with practical stereoscopic apparatus.

Another object is to provide means for reproducing stereoscopic images that are relatively rugged and are suited to retain adjustments in practice.

Other objects will become apparent upon reading the following detailed specification and upon examining the accompanying drawings, in which are set forth by way of illustration and example certain embodiments of my invention.

BRIEF DESCRIPTION OF ALL DRAWINGS

FIG. 10 shows a perspective view of the reproducing alternate pseudo slit embodiment of FIG. 4 and FIG. 5 according to my invention.

DETAILED DESCRIPTION OF DRAWINGS

Figure 1:
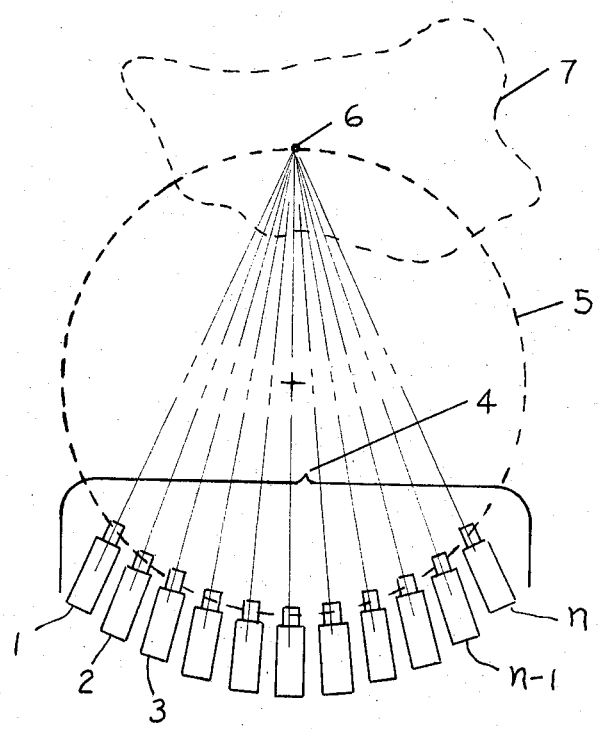
FIG. 1 shows a simplified plan view of plural cameras used to photograph pictures according to my invention.

In FIG. 1, bracket 4 includes cameras 1, 2, 3 through n in their respective positions where n can vary from about 30 to a few hundred depending on the size of construction — circle 5. All cameras have their optical axes pointing toward an aiming point 6 located on the construction — circle 5 on the side opposite from the plural cameras. An arbitrary three dimensional scene to be photographed is indicated by enclosure 7. The cameras (1 through n) can be of any type such as television, film or other special sensitive surface to receive the scene light and generate a picture with a perspective based on their respective locations relative to the scene 7. The cameras can operate concurrently or sequentially to photograph the scene.

Figure 2:
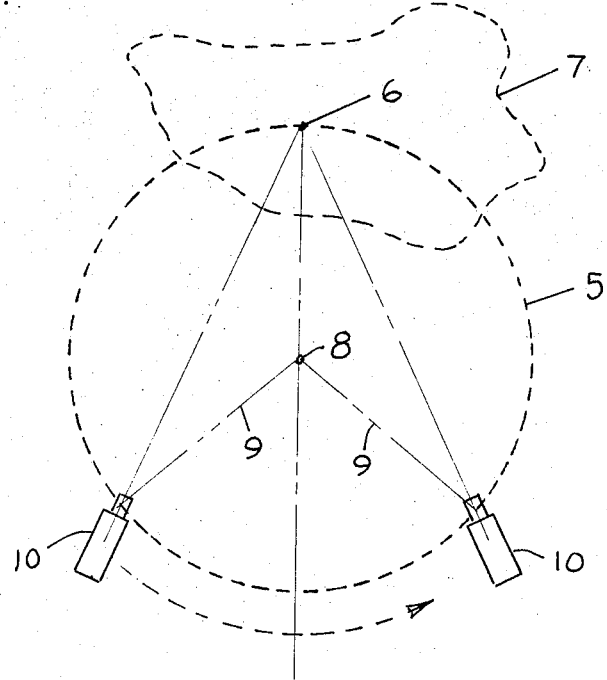
FIG. 2 shows a simplified plan view of an alternate sweeping single camera used to photograph pictures according to my invention.

FIG. 2 is similar to FIG. 1 except that in FIG. 2, a single camera 10 is used to sequentially take pictures at the locations of cameras 1, 2, 3 through n instead of the plural cameras as in FIG. 1. The single camera 10, in FIG. 2 is attached to radial arm 9 connected to the center of circle 5. The camera 10 sweeps over relative locations of cameras 1 through n as shown by dashed line with arrow. Camera 10 is constrained to have its optical axis point to aiming point 6.

Figure 3:
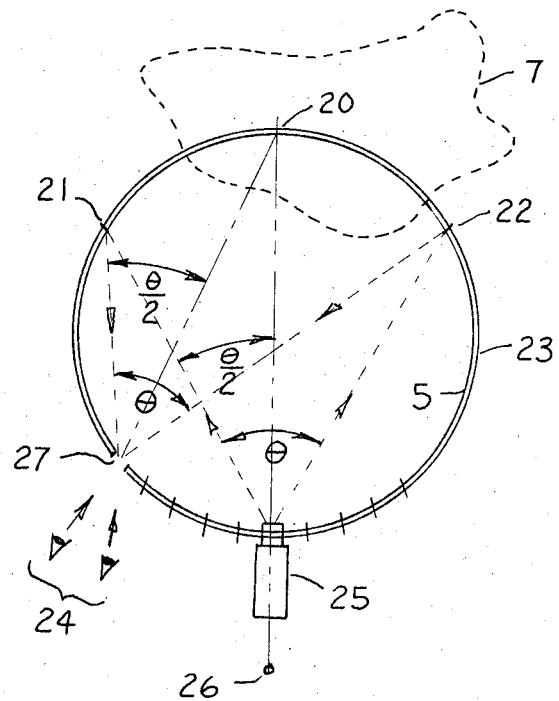
FIG. 3 shows a simplified plan view of a means for reproducing images using a stationary projector and a revolving vertical slit on a drum with observer location outside of drum according to my invention.

FIG. 3 shows a plan view of a reproduction embodiment of my invention. An arbitrary observer with two eyes is shown in bracket 24. An obturating cylinder surface 23 prevents the eyes from viewing reflective screen 21, 20, 22 except through the vertical slit opening 27 shown at the relative position of camera 1 of FIG. 1 and FIG. 2. A stationary projector 25 located at some reasonable distance in front of screen 21, 20, 22 is preferably arranged to lie along line 20 to 26 and project over the top or bottom of surface 23 so as to have an unobstructed projection path to the screen. Screen 21, 20, 22 is a high gain screen and is attached to the inside of drum surface 23 and rotates with it or as an alternative is arranged to be stationary and held inside of the drum so that surface 23 rotates around behind it. Projector 25 is a high frame rate projector capable of a few thousand pictures/second. Pictures from camera positions 1 through n photographed in FIG. 1 or FIG. 2 are developed and arranged in projector 25 to be projected sequentially in the order of camera positions 1 through n. Slit 27 in drum surface 23 moves at a constant velocity through relative camera positions 1 through n. The position of slit 27 is correlated with the sequentially projected camera pictures (1 through n) from projector 25 so that the picture perspective viewed through slit 27 is always the picture photographed at the same relative camera position.

The geometry of FIG. 3 is such that if projector 25 projects with angle $\theta$ to the screen left edge 21 and right edge 22, the screen subtends the same angle $\theta$ at the slit regardless of the slit position.

The moving slit 27 repeat period for scene coverage and speed of travel from relative position of camera 1 through n is approx. one-sixteenth second or faster to avoid flicker in viewing the three dimensional scene 7. Scene 7 in FIG. 3 is a reproduction of the scene 7 photographed by the cameras of FIG. 1 or FIG. 2. Projector 25 projects pictures from camera positions 1 through n while slit 27 moves over these same relative positions of cameras 1 through n. When the last picture from camera n is projected, a new vertical transparent slit opening in obturating drum 23 is arranged to be at relative position of camera 1 and the cycle repeats with projector 25 projecting pictures from camera positions 1 through n while slit 27 moves from relative positions of camera 1 through n. In FIG. 3 this cycling occurs continuously and repeatedly above the eye flicker rate forming a three dimensional picture of scene enclosure 7 which can be viewed by any reasonable number of observers. The observers can be arranged at various distances from drum surface 23 and over any azimuth angle in front of the drum where the moving vertical slit opening, observer's eye and screen line up. The subtended angle of the width of the vertical slit is made equal to the subtended angle between adjacent camera locations taken from FIG. 1 or FIG. 2. The size of circle 5 in FIG. 3 does not have to equal the size of circle 5 in FIG. 1 or FIG. 2. The ratio of size of the reproduction circle to the photograph circle determines the size of the reproduced three dimensional scene relative to the original scene photographed providing that the screen limits subtend the camera photographing angle at the slit. If the ratio is smaller than unity (reproduction circle smaller than photographic circle) the reproduction tends to be dwarf size. If the ratio is greater than unity, the reproduction tends to be giant size.

Figure 4:
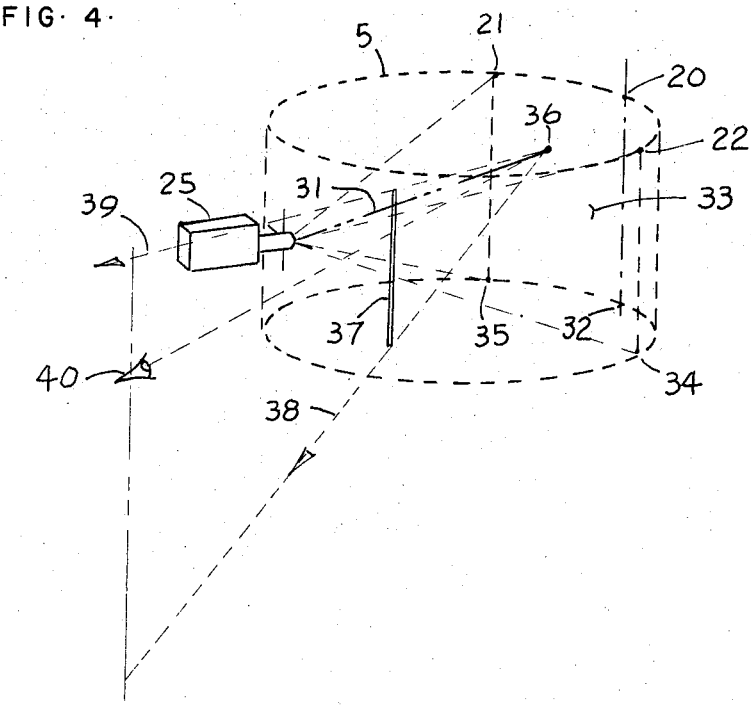
FIG. 4 shows an alternate reproducing means using a stationary projector and a pesudo slit instead of a real slit where the observer can be located on either side of the slit according to my invention.

FIG. 4 shows an alternate embodiment of a reproducing means according to my invention. Projector 25 of FIG. 4 is equivalent to projector 25 of FIG. 3 and its optical axis points toward the vertical line constructed with end points 20 and 32 and lies at the center of curved screen 33 determined by corner points 21, 22, 34 and 35. Screen 33 is both reflective and dispersive such that an arbitrary ray 31 from projector 25 incident on arbitrary point 36 of screen 33 reflects and disperses in a manner that directs its visibility to an observer only when the observer's eye 40, arbitrary point 36 and vertical intercept line 37 of cylindrical surface 5 are in the same plane and bounded by ray lines 38 and 39. Light reflected by screen 33 at point 36 is bounded by rays 38 and 39 which pass through the end points of imaginary vertical slit 37. All light rays projected from projector 25 that strike the special screen 33 are made to reflect and disperse through the imaginary vertical slit 37. The entire view is returned to imaginary vertical slit 37. The view of camera positions 1 through n that is projected by the projector 25, is correlated with the position of the imaginary vertical slit 37 so that the imaginary vertical slit is in the same relative position as the camera position for the photograph being projected. The reflection and dispersion characteristics of the screen 33 are varied to move the imaginary vertical slit through the positions of cameras 1 through n as the photographs from cameras 1 through n are projected by projector 25.

The result of the embodiment of FIG. 4 allows the obturating means 23 of FIG. 3 to be eliminated so that observer's eye 40 can move anywhere behind or in front of pseudo slit 37. In FIG. 4, a suitable practical close viewing distance inside the obturating surface 23 would be from the center of circle 5 to screen 33. A suitable practical far viewing distance outside the obturating surface 23 is 6 to 8 construction cylinder 5 diameters. Since light from the original scene is returned during reproduction in paths colinear to the direction of incident light rays in the photography of the scene, the reproduced scene is a faithful simulation in a three dimensional aspect to the original scene photographed. This reproduced scene can be viewed without the need for optical aids at the observer's eyes.

Figure 5:
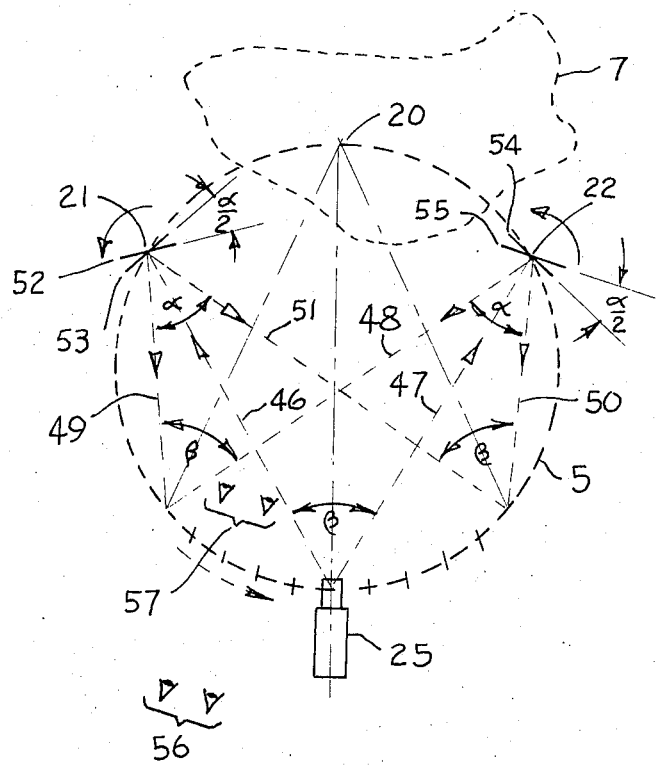
FIG. 5 shows a simplified plan view of the geometry and operation of the pseudo slit method of image reproduction according to my invention.

FIG. 5 shows a slightly modified plan view of FIG. 4. Where as FIG. 4 shows an arbitrary point 36 in time where only one picture is reflected to the imaginary slit 37, FIG. 5 shows two arbitrary points in time where relative positions of cameras 1 and n from FIG. 1 or FIG. 2 are shown receiving reflected pictures 1 and n. FIG. 5 is a practicable embodiment of my invention where special screen rotating vertical elemental reflectors/dispersers 52 and 53 at position 21 for the left edge of the picture and 54 and 55 at position 22 for the right edge of the picture are shown. More vertical elemental reflector/dispersers exist between screen positions 21 and 22 but are not shown to preserve FIG. 5 clarity. 52 and 53 are the same reflector/disperser shown at two different points in time. Likewise 54 and 55 are another reflector/disperser shown at two different points in time. Reflector/disperser positions 52 and 54 return the extreme edges of picture of camera 1 to camera position 1 along construction circle 5. Construction circle 5 of FIG. 5 is identical to construction circle 5 of FIG. 1, FIG. 2, FIG. 3 and FIG. 4. Reflector/disperser positions 53 and 55 return the extreme edges of the picture taken from camera position n to the position of camera n along construction circle 5. The reflector/disperser screen element at screen position 21 rotates from position 52 to position 53 which causes ray 46 projected from projector 25 to sweep from the position of camera 1 (reflected ray 49) to the position of camera n (reflected ray 51) on construction circle 5.

Rays 46 and 47 constitute a horizontal angle of $\beta$ degrees subtended at projector 25. The angle subtended at the position of camera 1 and position of camera n along construction circle 5 is also $\beta$ degrees. The angle subtended by rays 49 and 51 is the same as the angle subtended by rays 48 and 50 and equals $\alpha$ degrees as shown in FIG. 5. A ray reflected from a rotating plane reflector experiences an angular rotation of twice the angle of rotation of the reflector. Because of this, the angular difference between the two extreme angular positions (52 and 53) of the mirror at position 21 equals $\alpha/2$. Likewise, the angular difference between reflector position 54 and 55 at screen location 22 is $\alpha/2$.

Ray 46 always represents the left edge of the pictures from cameras 1 through n as projector 25 projects the sequence of pictures from cameras 1 through n (FIG. 1 or FIG. 2) onto the plural vertical reflector/disperser elements. Ray 49 is a reflection of ray 46 when projector 25 is projecting the picture from camera 1. Ray 51 is a reflection of ray 46 when projector 25 is projecting the picture from camera n. Likewise, ray 48 is a reflection of ray 47 when projector 25 is projecting the picture from camera 1 and ray 50 is a reflection of ray 47 when projector 25 is projecting the picture from camera n. Eye group 56 located outside of construction circle 5 or eye group 57 located inside of construction circle 5 both perceive the original scene 7 photographed in FIG. 1 or FIG. 2 as a three dimensional scene without the need for optical aids at the eye.

In FIG. 5, the several contiguous vertical elemental reflector/dispersers located between positions 21 and 22 rotate at the same angular velocity and are synchronous with each other and projector 25. Entire pictures are successively created at positions of camera 1 through n along construction circle 5. In order that the observer's eyes at position 56 or 57 do not have to lie in the same horizontal plane as the projected rays, a vertical screen dispersion is induced on the vertical elemental reflector/dispersers (positions 21 and 22) and plural points in between positions 21 and 22. This vertical dispersion is done by incorporating a vertical wave as in FIG. 10A having a suitably short period distance for adequate viewing resolution. A practical period distance would subtend 1 or 2 minutes of arc at the observer's eye location. The practicable shape and construction embodiment for the principle of FIG. 5 is shown and described under FIG. 10, FIG. 10A and FIG. 10B.

Figure 6:
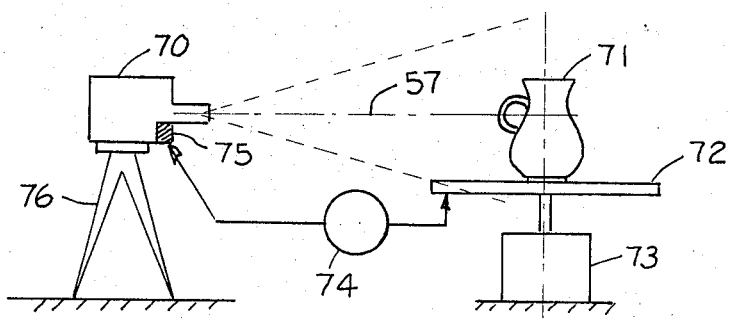
FIG. 6 shows an elevation view of a photographic embodiment using fixed camera and revolving turntable containing typical subject matter according to my invention.

In FIG. 6, camera 70 is supported by tri-pod 76. Frame advance 75 is triggered by sense/control 74. Sense/control 74 senses the azimuth position of turntable 72 which is turned by motor 73. The object 71, to be photographed, rests on turntable 72. Camera 70 is arranged so that its optical axis 57 points toward the center of rotation of turntable 72. Motor 73 rotates the turntable about 1 rev/minute. A table 72 position — sense control 74 operates a camera frame advance 75.

A quantity of pictures may be recorded on ordinary motion picture film when the camera 70 has a single frame advance mechanism. One picture is taken for each of the selected azimuth locations of turntable 72. The quantity of pictures may vary from about 30 to a few hundred depending on the viewing distance and size of the reproduction embodiment. Pictures 1 through n are photographed as in FIG. 1 and FIG. 2 such that the rotation angle of the turntable covers the angle subtended at point 20 of FIG. 5 by positions of cameras 1 and n on construction circle 5.

Motion picture linear film strips are but one of the means of photographing that can be used by my invention. Any means of acquiring a sequential series of pictures which can be sequentially returned to the projection screen by projector 25 will suffice to meet the objectives of the photographic system.

FIG. 1 and FIG. 2 represent a photographic method compatible with the implementation technique of FIG. 6 in that the relative perspective changes between objects in scene 7 of FIG. 1 and FIG. 2 and those on the turntable of FIG. 6 are the same. The basic difference is that FIG. 1 and FIG. 2 allow photography of scenes containing closeup objects with an infinity background whereas FIG. 6 acquires three dimensional information for only those objects on the turntable. Any scenery behind the turntable which is stationary with respect to the stationary camera 70 will appear flat in the reproducing system of FIG. 3, FIG. 4 and FIG. 5.

Figure 7:
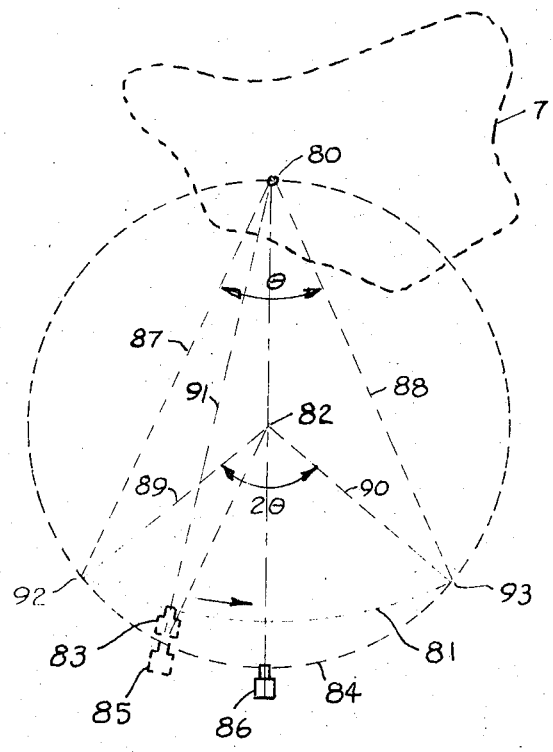
FIG. 7 shows the interrelated geometry of photographing with FIG. 1, FIG. 2 and FIG. 6 and with the reproduction of FIG. 3, FIG. 4 and FIG. 5.

FIG. 7 shows an interrelation between the photographic means of FIG. 6 and the practical embodiment of reproduction means of FIG. 3, FIG. 4 and FIG. 5. Scene 7 is identical to that used in FIG. 1 and FIG. 2 and can extend to infinity and have the same relationship to aim point 80 as to aim point 6 of FIG. 1 and FIG. 2. From FIG. 6 the center of turntable 72 is represented by aim point 80 of FIG. 7. Camera 83 is shown pivoting about 80 with arm 87 over circular locus 81 until 81 intersects with circle 84 at two locations (92 and 93). The perspectives photographed by 83 along 81 are identical to what stationary camera 70 of FIG. 6 would view of object 71 on turntable 72.

The information photographed in FIG. 6 related to that photographed in FIG. 7 is identical in perspective since the resultant relative motion of the camera to the scene is the same. In FIG. 7, the angle subtended at 80 by 87 and 88 is $\theta$. The angle subtended at 82 by 89 and 90 is $2\theta$. If $\theta$ is evenly divided to make equal increments along 81 and $2\theta$ is divided by the same factor to make equal increments along 84, the increment marks on 81 and 84 will align with 80 (camera 83 and simulated projector 85 are shown aligned with 80). The perspective photographed by camera 83 is projected from stationary projector 86 and is equivalent to the perspective projected by simulated projector 85. The proper time sequence for scene projection relative to the vertical slit position must be used as described in the detailed description of FIG. 3. The only disparity in FIG. 6 being applied to FIG. 3, FIG. 4 and FIG. 5 is the short distance between 83 and 85 along the aim line 91 to aim point 80. For practical purposes, this disparity is negligible and allows the simple photographic embodiment of FIG. 6 to be employed without the need for a special linkage as FIG. 2 requires from camera 10 to construction circle 5 with center 8 and to aim point 6. In the embodiment of FIG. 7 the aim point 80 and projector 86 still have the same relation to circle 84 as the aim — point 20 and projector 25 has to circle 5 of FIG. 3. The photographic aim point in FIG. 6 is actually the center of turntable 72 — which is coincident with aim — point 80 of FIG. 7.

Figure 8:
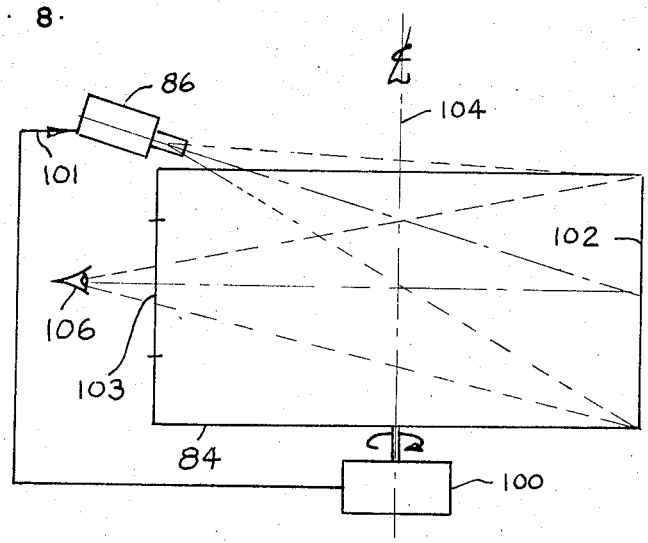
FIG. 8 shows an elevation view of the embodiment of the reproducing method of FIG. 7 according to my invention.

FIG. 8 shows a simplified side elevation view of FIG. 7 and of FIG. 3. Stationary projector 86 projects the pictures from cameras 1 through $n$ photographed in the photographic set up of FIG. 1, FIG. 2 or FIG. 6 in a cyclic sequential manner as described in the detailed description of FIG. 3. The pictures are projected over the rim of circular obturative cylinder 84 onto internal circular high gain screen 102. Cylinder 84 is rotated by motor 100 about axis 104 at a rotational rate that will allow one or more vertical transparent viewing slits 103 to pass the observer's eye 106 in approximately one-sixteenth second or faster to eliminate the sensation of flicker. To avoid internal screen reflectance and consequent contrast degradation, a high gain reflective screen is used that directs most of the incident light back to the viewing slit 103.

Linkage 101 between motor 100 and projector 86, provides synchronization between slit position 103 and the picture projected at any given time by projector 86. This synchronization requirement is described in detail in the description of FIG. 3. The synchronizing link 101 may be mechanical or accomplished through an electronic synchro method or any other method that results in the proper phase relationship between pictures projected on screen 102 and vertical transparent slit 103 location.

Figure 9:
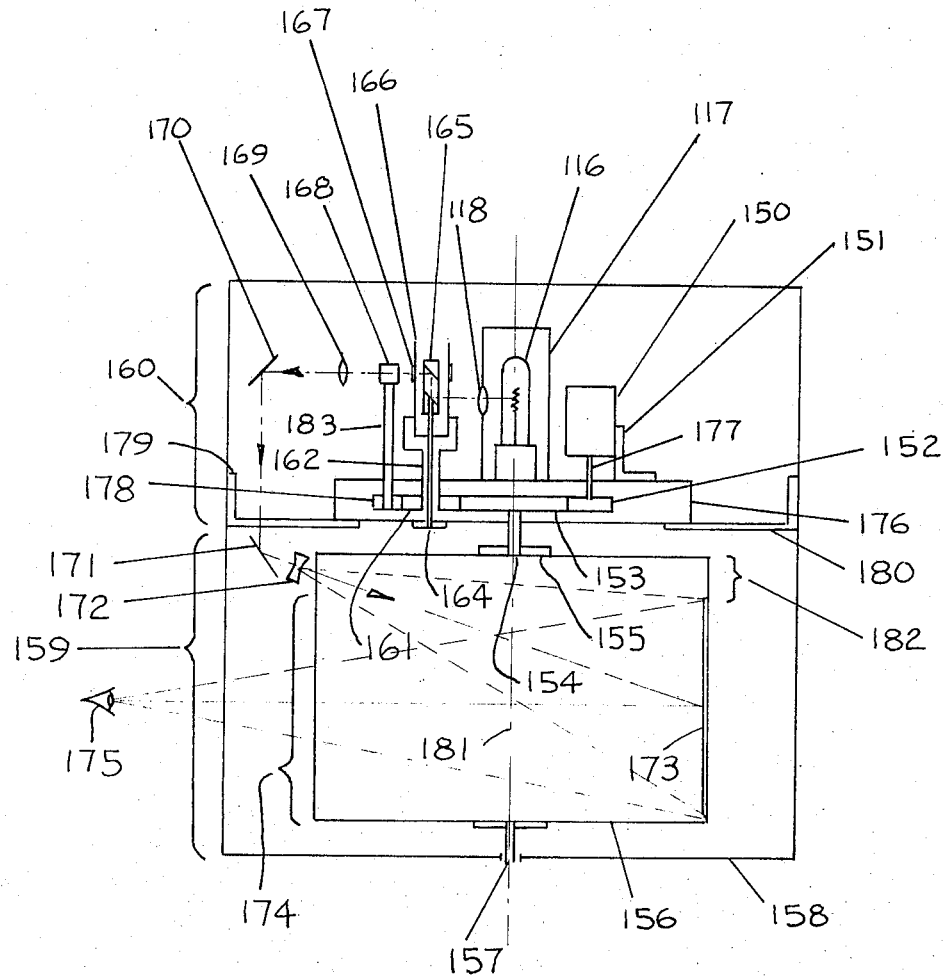
FIG. 9 shows a detailed elevation view of the embodiment of the reproducing method of FIG. 3 according to my invention.

FIG. 9 shows a cross-sectional side elevation view of a detailed embodiment of FIG. 3. Although only a single radial projection path is shown in FIG. 9 an omni directional light source 116 and equivalent optics can be employed to generate plural three dimensional scenes on a circumferential screen 173. In FIG. 9, electric Motor 150 is attached to gearbox 176 by bracket 151. Motor gear 152 is attached to motor shaft 177. Motor gear 152 drives gear train 153, 161 and 178. Gear box 176 is connected to outside housing (right circular cylinder 158) by means of brackets 179 and 180. Cylinder 158 is opaque in area 160 for 360 degrees and transparent in area 159 over the required angle of view. This angle is approximately 120 degrees as required for eye 175 to view screen 173. The observer's eye 175 views screen 173 on internal obturative rotating right circular cylinder 156 through vertical transparent slit 174 in cylinder 156. Cylinder 156 is pivoted at the center rotation axis 181 so that the base of cylinder 156 rests in pivot 157 and the other end of cylinder 156 is attached to gear 153 through shaft 154 which in turn is permanently connected to flange 155 which is anchored to cylinder 156. The area 182 is transparent in the cylinder 156 above the slit 174 so that divergent projected light refracted by negative lens 172 can have a non-obstructed projection path to screen 173. Gear 161 is attached to hollow shaft 162 which is attached to film module receptacle 163. Through the center of hollow shaft 162, stationary solid shaft 164 is connected to stationary periscope 165. Periscope 165 is made of two front surface vertically off-set 45 degree angle mirrors. Circulating 360 degrees around periscope 165 is the hollow plastic tubing film module 166. Film strip 167 is attached to film module 166 via adhesive tape along the sprocket hole borders of film strip 167.

An 8 mm film strip may be used to wrap around film module 166. The film strip 167 contains pictures from cameras 1 through n described in photographic FIG. 1, FIG. 2 and FIG. 6. Light originating from projection lamp 116 in lamp house 117, is condensed by condenser lens 118. Light from condenser lens 118 is reflected from the two off-set mirrors of periscope 165 so that the light center has been elevated to pass through film strip 167. The light then goes through multi sided rotating prism 168, projection lens 169, reflects downward from front surface mirror 170 and then reflects from mirror 171 and is then directed through negative field lens 172 which diverges the projected light to project the scene on screen 173. Multi sided prism 168 is the ordinary octagon (8 sided) shaped prism commonly used in 8 mm motion picture editor machines and takes the place of the pull down claw or geneva movements of some standard projector and camera equipment. Film module 166 rotates approximately 40 rev/second and the film strip carries 32 pictures. These numbers are variable with design. 8 facet prism 168 must present a new facet for each of the 32 pictures and therefore rotates 4 times faster than film module 166. Prism 168 is turned via gear 178 attached to shaft 183. Cylinder 156 has 3 vertical transparent slits 174 arranged at 120 degree intervals around its periphery. Cylinder 156 rotates in synchronism with the pictures being projected so that the vertical slits 174 and pictures develop a three dimensional scene.

Figure 10A:
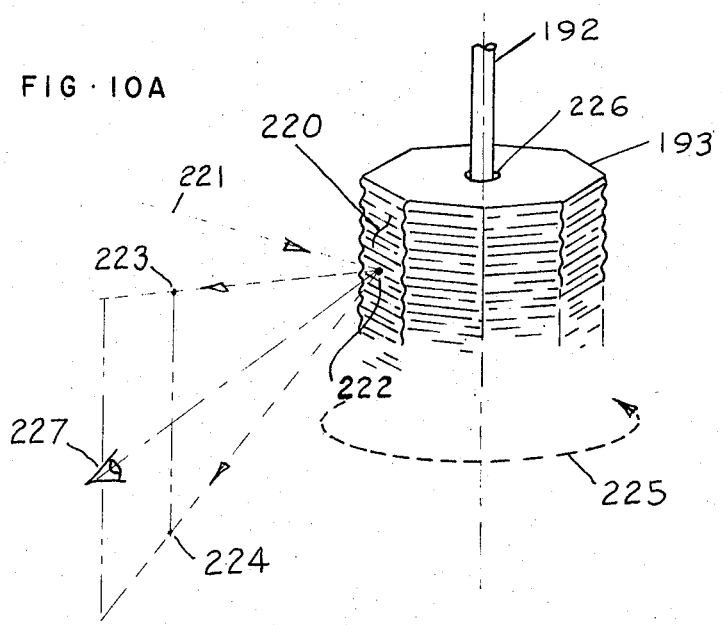
FIG. 10A shows an octagon screen element reflector from FIG. 10.
Figure 10B:
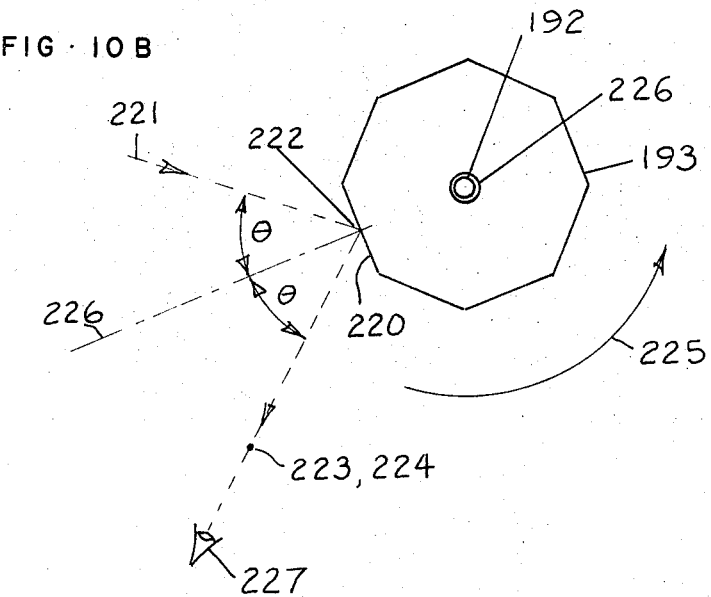
FIG. 10B shows an enlarged view of the octagon screen element reflector from FIG. 10.

FIG. 10 shows a perspective view of the reproduction alternate pseudo slit embodiment of FIG. 4 and FIG. 5 according to my invention. FIG. 10 is not drawn to scale but shows that observer's 200 and 201 may be located either inside or outside of construction circle 190. Circle 190 may be extended upward and form the surface of an imaginary right circular cylinder of which pseudo exit slit 205 is constructed on an element. The operation of the pseudo slit which forms a part of my invention, is described in detail in the description of FIG. 4 and FIG. 5. Slit 205 extends along an element from top to bottom of the cylinder determined by extension of circle 190 and rotates around the cylinder surface while remaining parallel to itself. Pseudo slit 205, at any given point in time, receives all of the light projected from station projector 199. The light projected by projector 199 sequentially forms a complete view for the viewing vantage point around circle 190. These views are sequentially reflected to the viewing locations by the screen made of pre-phased rotating reflective elements (as 193) described separately in detailed description of FIG. 10A and FIG. 10B.

The diameter of rotating screen elements 193 is small enough that the angle $\beta$ subtended at the observer 200 location is approximately 1 minute of arc. The angle 2$\beta$ is subtended at the observer 200 location by lines drawn from the centers of 2 adjacent rotating screen elements 193. The quantity of elements 193 is a few thousand in order to assure proper resolution in the 3-dimensional picture. Elements 193 may be molded to conform with details of FIG. 10A and 10B. The center of element 193 is hollow so that a taunt wire 192 may be threaded through each of the rotating molded elements and attached to a screen construction frame 191 at the top and bottom. The elements 193 are arranged side by side to conform to the cylinder determined by circle 190. The end of element 193 has a molded sprocket 194 that is linked to timing belt 195 and to all of the vertical rotating elements of the screen and to servo motor 196. Motor 196 sets the timing control for phase locking projector 199 picture projection to the screen elements 193. All screen elements, 193, rotate at the same angular velocity but have the proper phase relationship to return the projected light from projector 199 to exit slit 205 as it takes on the sequential camera positions 1 through n. The phasing of screen elements 193 and projector 199 is done only one time at equipment set up and from that time forward synchro motor 196 and projector 199 are phase locked through interconnect 206. A standard mechanical or electrical servo link may be used.

Arbitrary observer eyes 203 and 204 are shown constrained by pseudo exit slit 205 in a moment of time so that only the proper vertical line of scene information is viewed from that particular observer location. As the slit moves with respect to time, the entire scene is constructed of several contiguous vertical lines, one from each of the screen elements 193 and appears as a three dimensional scene to the observer.

FIG. 10A shows an enlarged view of the rotating vertical screen reflective/dispersive element 193. Element 193 is octagon in cross section as shown by companion plan view FIG. 10B. Element 193 has its center bored out represented by 226 and taunt wire 192 is threaded through the entire length of 193 as better depicted in basic drawing FIG. 10. Surface 220 is identical to all 8 surfaces on 193 and is a corrugated (waving) surface when viewed via a vertical cross sectional plane and a flat (unwaving) edge when viewed via a horizontal cross sectional plane. Surface 220 is highly reflective. This may be accomplished by nickle-chrome plating if the segments 193 are manufactured by plastic molding techniques.

Element 193 is rotating around wire axis 192 at a constant rate of approximately 3 rev/sec. This causes a sweep rate of 24 sweeps per second. A 45 degree rotation as shown by arrow 225 causes a fixed incident ray of light, as viewed parallel to the rotation axis 192, to sweep the audience view area by 90 degrees. This sweep action is continuous as element 193 rotates constantly. The sweeping light leaves the right side 90 degree limit and the next reflective/dispersive facet of 193 starts again on the left and sweeps to the right by 90 degrees. The corrugated (waxy) reflective/dispersive surface of 220 causes arbitrary incident single ray 221, incident at point 222 of surface 220, to be dispersed into a vertical plane of light included in surface 222, and points 223 and 224 as shown in FIG. 10A. FIG. 10B shows the same rays as they would appear projected onto a horizontal plane viewing surface. Ray 221 makes angle $\theta$ with construction line 226. Line 226 is normal to reflective surface 220. The reflected/dispersed plane of light determined by points 221, 222 and 223, also makes an angle $\theta$ with normal 226 showing that a normal plane reflective geometry exists in the horizontal plane. In a vertical plane, the information contained in ray 221 may be viewed by an observer only if his eye 227 lies in the plane determined by points 222, 223 and 224. By this means the pseudo exit slit 205 of FIG. 10 is generated as the multitudes of elements 193 making up the whole screen area, reflect and vertically disperse all the screen's incident light to the moving pseudo slit 205.

Variations may be made in the arrangement, size, proportions and shape of the illustrative embodiments shown without departing from the scope of my invention.

Having thus fully described my invention and the manner in which it is to be practiced, I claim:

1. The method of recording and reproducing stereoscopic views for observation by plural observers without visual aids at the eyes of said observers, comprising:

a. Photographing multiple complete views of a scene from a plurality of consecutive sequential positions arranged along a photographing circle, the optical axes of the photographing cameras at the plurality of positions converging to an aiming point in the scene and on the opposite side of said photographing circle;

b. Projecting the said multiple complete views in a consecutive sequential manner to a high gain screen on a projecting circuit from a fixed high frame rate projector, said projecting circle having a plurality of consecutive sequential view points corresponding to the said consecutive sequential positions of said photographing circle and located on the opposite side of said projecting circle from said screen, the projected view subtending angle measured from a view point on said projecting circle being equal to the photographing subtending angle measured at the camera on the photographing circle at the time of photographing;

c. Providing a horizontally scanning vertical slit on the opposite side of said projecting circle from said screen and moving said vertical slit along said projecting circle past said view point locations;

d. Synchronizing the projection of said multiple complete views from said fixed projector with the movement of said horizontally scanning vertical slit such that for a given view, at the time it is projected, the vertical scanning slit is in a position on said projection circle corresponding to the position of the camera on the photographing circle at the time the view was photographed;

e. Repeating the scanning cycle at a rate sufficient to be within the period of persistence of vision of an observer.

* * * * *